Nov. 13, 1923.　　　　　　　　　　　　　　　　　　1,473,768
L. W. HOTTEL
REENFORCED RIBBED PNEUMATIC TUBE
Filed Dec. 13, 1920
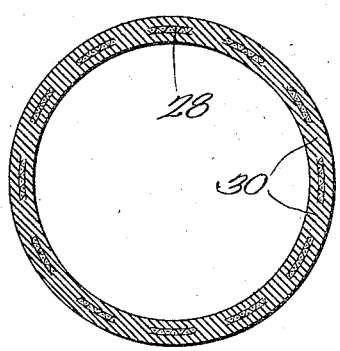
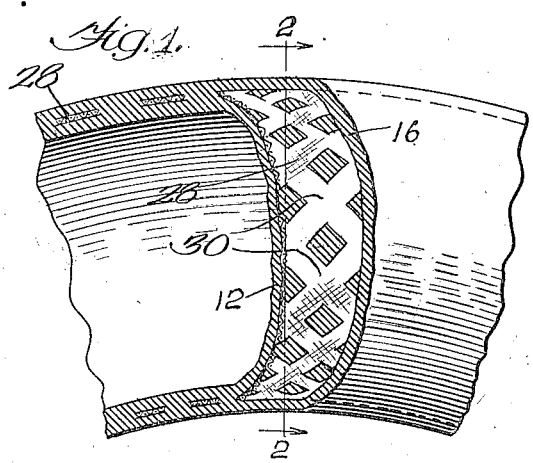
Inventor:
Louis W. Hottel.
By Cheever & Cox Attys Patented Nov. 13, 1923.

1,473,768

UNITED STATES PATENT OFFICE.

LOUIS W. HOTTEL, OF CHICAGO, ILLINOIS.

REENFORCED RIBBED PNEUMATIC TUBE.

Application filed December 13, 1920. Serial No. 430,142.

*To all whom it may concern:*

Be it known that I, LOUIS W. HOTTEL, a citizen of the United States, residing at Chicago, in the county of Cook and State of Illinois, have invented a certain new and useful Improvement in Reenforced Ribbed Pneumatic Tubes, of which the following is a specification.

This invention relates to inner tubes for pneumatic tires used upon automobiles and the like.

It is well understood that it is impossible to follow the usual method of building up sheets of thin rubber and winding them on a pole to make an inner tube without a distinct grain being formed in the rubber, with the result that when the tube is punctured while the tube is under pressure, the force of the air escaping from the punctured tube is apt to split the tube for an indefinite distance, thus seriously injuring if not ruining it. The object of this invention is to reinforce the ordinary inner tube in the process of manufacture to form a construction in which when a puncture or tear occurs, it can only extend a very short distance without coming upon reinforcing strips built into the tube which stop the spread of the puncture or tear and thereby make the work of the repair man very much less. A further object is to so construct the tube for this purpose without destroying the elasticity of the tube so it can expand from its normal saleable size to the size required of it in actual use in the casing. The invention consists more particularly in the incorporation in the wall of the inner tube, of properly arranged strips of fabric material, preferably of what is known in the trade as cord fabric material, adapted to permit stretching of the tube and at the same time limit the spread of punctures or other cuts in the tube.

Referring to the drawing wherein like numerals indicate corresponding parts in the views:—

Figure 1 is a fragmentary side view partly in section; and

Figure 2, a section on the line 2—2 of Fig. 1.

In constructing my improved inner tube I first wind on to a pole or other forming device a plurality, usually two layers, of thin rubber 12. Over this I then spirally wind in opposite directions respectively two bands of cord fabric 28 with the adjacent turns of each band spaced apart. I then place over this structure other layers of rubber 16, so that when the whole is vulcanized a tube is produced having effectively reenforced areas 30 of checker work arrangement and formed by the overlying portions of the bands 28. As a result of this construction, it will be apparent that if the tube is punctured between these reenforced portions, the opening produced thereby can only spread until it comes to the reinforcement 30 where further extension of the opening is arrested. This insures a much smaller opening for repair than would be the case if my improved construction were not present.

In assembling my tube the fabric 28 is not stretched materially in being placed on the pole as is the practice in making tire casings, but is, on the other hand, left comparatively loose with the result that the tube can be vulcanized without destroying the stretching property of the fabric, as is done intentionally in tire casing production. The result is that the tube produced is readily stretchable within desired limits, notwithstanding the fact that the fabric material is imbedded in the rubber of the tube.

By varying the spacing between the adjacent turns of each fabric band, and consequently varying the spacing between the reenforced portions of the finished tube, the ultimate strength of the tube may be materially increased or decreased as desired, the same being under all conditions stronger than the ordinary rubber inner tube which is without fabric reinforcement.

Fabric material as is well understood in the art is usually cut on a bias, so that it will allow ready and ample expansion of my tube under normal working conditions, and yet it provides sufficient reinforcement to prevent excessive spreading of an opening resulting from conditions previously set forth.

I claim:—

An inner tube formed of inner and outer layers of rubber vulcanized together with stretchable fabric reinforcement therebetween, said reinforcement being provided by oppositely spirally wound bands of fabric with the adjacent turns of each band spaced apart, whereby reinforcement areas of double thickness are provided at uniformly distributed locations throughout the tube.

In witness whereof, I have hereunto subscribed my name in the presence of two witnesses.

LOUIS W. HOTTEL.

Witnesses:
 GEO. W. BROWN,
 DWIGHT B. CHEEVER.